US011220288B2

(12) United States Patent
Sachs et al.

(10) Patent No.: US 11,220,288 B2
(45) Date of Patent: Jan. 11, 2022

(54) METHOD AND DEVICE FOR THE CONTROL OF A SAFETY-RELEVANT PROCESS AND TRANSPORTATION VEHICLE

(71) Applicant: VOLKSWAGEN AKTIENGESELLSCHAFT, Wolfsburg (DE)

(72) Inventors: Tobias Sachs, Braunschweig (DE); Sebastian Schmidt-Schäfer, Weinbergen ot Bollstedt (DE); Frank Schöttler, Braunschweig (DE)

(73) Assignee: Volkswagen Aktiengesellschaft

( * ) Notice: Subject to any disclaimer, the term of this patent is extended or adjusted under 35 U.S.C. 154(b) by 347 days.

(21) Appl. No.: 16/439,784

(22) Filed: Jun. 13, 2019

(65) Prior Publication Data

US 2019/0382045 A1 Dec. 19, 2019

(30) Foreign Application Priority Data

Jun. 19, 2018 (DE) ...................... 10 2018 209 833.6

(51) Int. Cl.
*B62D 5/04* (2006.01)
*B60R 16/023* (2006.01)
*G07C 5/08* (2006.01)

(52) U.S. Cl.
CPC .......... *B62D 5/049* (2013.01); *B60R 16/0232* (2013.01); *G07C 5/085* (2013.01)

(58) Field of Classification Search
CPC ...... B62D 5/049; B62D 5/003; B62D 5/0484; B60R 16/0232; G07C 5/085; B60W 50/045; B60W 50/029
See application file for complete search history.

(56) References Cited

U.S. PATENT DOCUMENTS 6,683,432 B2 * 1/2004 Griffis ................ G05B 19/4061
318/567
10,168,703 B1 * 1/2019 Konrardy ................ B60R 21/34
(Continued)

FOREIGN PATENT DOCUMENTS

DE 19946073 A1 5/2001
DE 10052343 A1 7/2002
(Continued)

*Primary Examiner* — Russell Frejd
(74) *Attorney, Agent, or Firm* — Barnes & Thornburg LLP

(57) ABSTRACT

A hardware architecture for controlling a safety-relevant process having at least two microcontrollers for controlling the process in at least two control branches, wherein the respective microcontroller control the safety-relevant process. The microcontrollers process the data from at least one sensor, which detects the actual characteristic of the respective control branch. Between the two microcontrollers, the data of the respective sensor are exchanged and provided for each microcontroller and a check is made to determine whether the data from the sensors are consistent. In response to an inconsistency being detected, a majority decision is made and a model value used in forming the majority decision, is calculated in the microcontroller based on control commands so the control of the safety-relevant process by the microcontroller of the control branch, whose data were detected as erroneous in the majority decision, is disabled.

16 Claims, 4 Drawing Sheets

(56) References Cited

U.S. PATENT DOCUMENTS

| | | | |
|---|---|---|---|
| 10,343,713 B2 | 7/2019 | Asao et al. | |
| 2003/0097230 A1* | 5/2003 | Garabedian | G05B 9/02 |
| | | | 702/104 |
| 2014/0027565 A1* | 1/2014 | Marvin | B64C 27/56 |
| | | | 244/17.13 |
| 2017/0164293 A1* | 6/2017 | Hwang | H04W 52/0261 |
| 2020/0023887 A1 | 1/2020 | Sasaki et al. | |

FOREIGN PATENT DOCUMENTS

| | | |
|---|---|---|
| DE | 102009005836 A1 | 7/2010 |
| DE | 102013203978 A1 | 9/2014 |
| DE | 102015121910 A1 | 6/2017 |
| DE | 102016203090 A1 | 8/2017 |
| DE | 102016205109 A1 | 10/2017 |
| EP | 1426266 A2 | 6/2004 |
| EP | 2450261 A2 | 5/2012 |
| EP | 3299257 A1 | 3/2018 |
| JP | 2006228002 A | 8/2006 |
| WO | 2017122329 A1 | 7/2017 |
| WO | 2017159090 A1 | 9/2017 |
| WO | 2018051550 A1 | 3/2018 |
| WO | 2018122329 A1 | 7/2018 |

\* cited by examiner

METHOD AND DEVICE FOR THE CONTROL OF A SAFETY-RELEVANT PROCESS AND TRANSPORTATION VEHICLE

PRIORITY CLAIM

This patent application claims priority to German Patent Application No. 10 2018 209 833.6, filed 19 Jun. 2018, the disclosure of which is incorporated herein by reference in its entirety.

SUMMARY

Illustrative embodiments provide a method and an apparatus for controlling a safety-relevant process and a transportation vehicle having the disclosed apparatus.

BRIEF DESCRIPTION OF THE DRAWINGS

An exemplary embodiment is shown in the drawings and is explained in more detail in the following with reference to the figures, in which.

DETAILED DESCRIPTION

Figure 1:
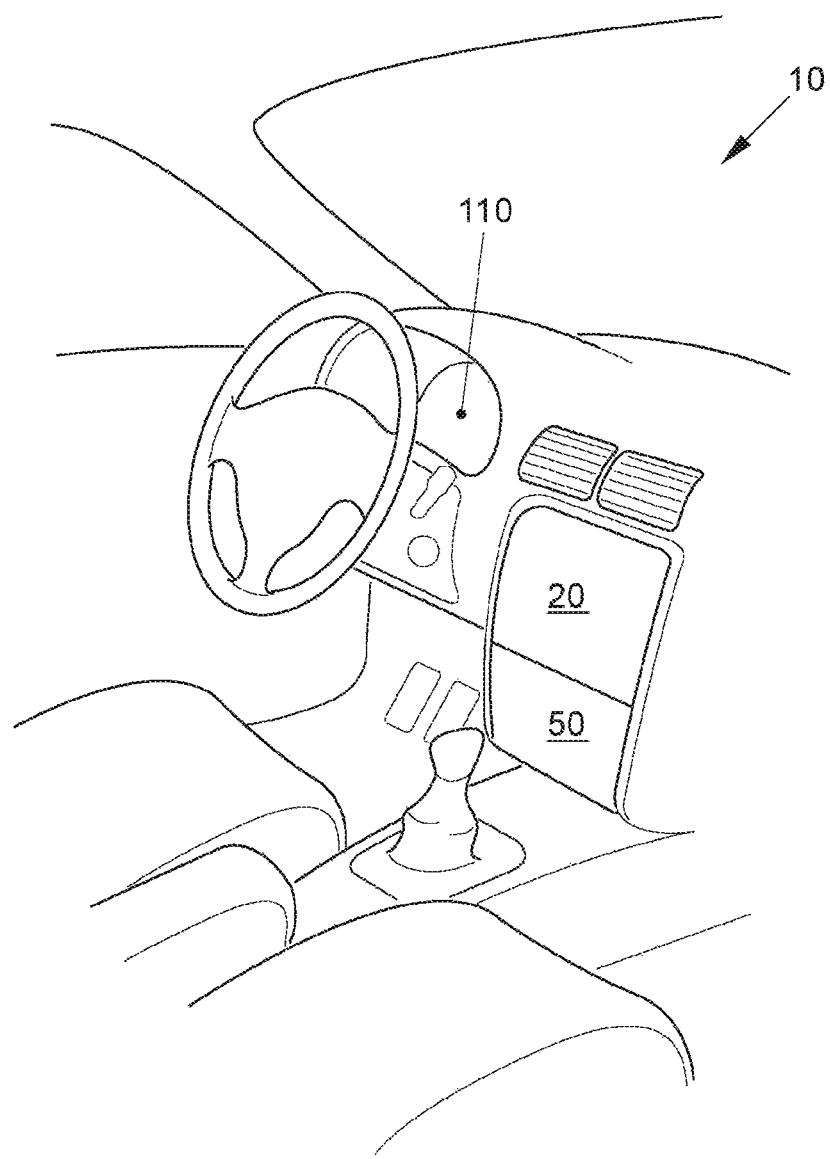
FIG. 1 shows the typical cockpit of a transportation vehicle.

In modern transportation vehicles electromechanical steering systems are normally used (FIG. 1). If faults occur in the electronics of these steering systems in operation, the power steering system is turned off or reduced. The driver then requires increased effort to steer the transportation vehicle.

In the near future, autonomous driving systems will be used in transportation vehicles, which allow the driver to be no longer permanently occupied with the driving task and, in the case of active driving systems, to carry out secondary activities (reading, sleeping, writing messages . . . ). The driver is therefore no longer available to the steering system as a fall-back level in the event of a fault. Thus, the steering system that is used in connection with an autonomous driving system must still be able to drive the transportation vehicle and adjust the movement of the steering rack even after a fault.

The term autonomous driving (sometimes also referred to as automatic driving, automated driving or piloted driving) is understood to mean the locomotion of transportation vehicles, mobile robots and driverless transport systems which behave largely autonomously. There are different gradations of the concept of autonomous driving. On certain levels the term autonomous driving is used when a driver is also present in the transportation vehicle, who is only responsible for monitoring the automatic driving operation. In Europe, the various ministries of transport (in Germany, the Federal Highway Research Institute was involved) collaborated and defined the following autonomy levels.

Level 0: "Driver only", the driver drives, steers, brakes, accelerates, etc. him/herself.

Level 1: Certain assistance systems give assistance during the transportation vehicle operation (including a Distance Control System-Automatic Cruise Control ACC).

Level 2: Partial automation. Functions such as automatic parking, lane keeping function, general longitudinal guidance, accelerating, braking, etc. are performed by the assistance systems (including traffic jam assistant).

Level 3: High automation. The driver does not need to continuously monitor the system. The transportation vehicle independently carries out functions such as the triggering of the indicator, lane changing and lane maintenance. The driver can attend to other things, but when necessary is prompted by the system to assume control within a pre-warning period. This form of autonomy is technically feasible on motorways. The legislator is working towards approval of Level 3 transportation vehicles. The legal framework for this has already been created.

Level 4: Full automation. The control of the transportation vehicle is performed by the system throughout. If the driving tasks are no longer manageable by the system, the driver may be prompted to take over control.

Level 5: There is no driver required. Apart from setting the destination and starting the system, no human intervention is required.

Automated driving functions from Level 3 and above relieve the driver of responsibility for control of the transportation vehicle. Any steering system involved which can fail due to a single fault therefore needs an appropriate fallback level to be able to keep the transportation vehicle in a safe driving state at all times until the driver can intervene again, or else with a higher level of autonomy, until the transportation vehicle comes to a standstill without the action of the driver. The safety-relevant systems such as braking systems, driving dynamics systems, steering systems, etc. for this type of transportation vehicles, which offer automated driving of level 3 or above, are always redundantly designed. They then consist of two control branches, both of which can perform the control process, so that one component can fail without putting the driving stability at risk.

A safety concept in this case requires the doubly redundant design of the steering system electronics. The input signals to the power-assisted steering control unit are already available in duplicate. The logic section is also implemented in duplicate, where a parallel, independent signal processing takes place. This also applies to the power section, which is also implemented in duplicate and controls one or more suitable electric motors (e.g., 6-phase or 12-phase motor). If a fault then occurs in one of the two subsystems, the other subsystem is in principle capable of providing at least a reduced steering assistance to generate a movement of the steering rack.

A challenge with this structure is that any detected fault must be identified as such with a quantifiable confidence level. To fulfill the safety requirements and to avoid unjustified power reductions and shutdowns, it is necessary for the fault to be confirmed by a separate entity.

In so doing, the proper functioning of the control unit should be monitored, as well as the proper functioning of the rotor position sensors, which detect the actual rotor characteristic.

The other control branch alone cannot be relied upon here, however, since in the event of a contrary decision the probability that this test has delivered an incorrect result is the same as the probability that the fault detected by the other control branch has been recognized as incorrect.

Hence a third entity is necessary, which in this case has the casting vote as to whether the fault is confirmed as such or not (2 out of 3 decision). To monitor the proper functioning of the microcontrollers in the power-assisted steering control unit, in another patent application by the applicant a solution is described which manages without the use of a third, independent microprocessor (state of the art in aerospace technology).

In the patent application described here, a solution is specified for verifying the proper functioning of the rotor position sensors.

Document EP 2 450 261 A2 discloses an apparatus for controlling an electric motor for a power steering system. Here, a main processor receives the signals from sensors, processes them and outputs control signals. In addition, a monitoring computer is also provided, which also receives the signals from the sensors and is capable of taking the place of the main computer in case it fails or incurs a fault.

DE 10 2016 203 090 A1 discloses a control unit with at least two microcontrollers, wherein the at least two microcontrollers are in communication with each other via at least one Ethernet connection and are configured to use this to exchange data. This can be used to ensure that the individual microcontrollers can also communicate with each other in the event of a fault, for example, if one of the microcontrollers has a defect or if one of the Ethernet connections fails, for example, due to a cable break. In one example, the control unit has four microcontrollers each with two processor cores, which are connected to each other in a ring configuration.

DE 10 2016 205 109 A1 discloses a microprocessor with at least two processor cores, wherein a first processor core is configured to execute the functions implemented in hardware using specially configured hardware, and a second processor core is configured to execute the functions implemented in software by executing software. The first processor core is configured to monitor and/or secure a function executed by the second processor core. The monitoring is based on the use of redundant hardware.

Disclosed embodiments provide a solution with which the proper functioning of the rotor position sensors can be verified without the need to install a third rotor position sensor. The solution should be cost-optimized, but at the same time, fulfill the safety requirements.

Disclosed embodiments provide a method for controlling a safety-relevant process, an apparatus for controlling a safety-relevant activity, and a transportation vehicle.

The safety concept used requires a special hardware architecture. For controlling the safety-relevant process, at least two micro-controllers are used, each of the at least two microcontrollers being used for controlling the safety-relevant process. This is therefore a redundant system. Between the two microcontrollers, data are exchanged with the aid of appropriate communication method or mechanism. Each microcontroller processes the data of at least one sensor, which reflects the actual characteristic of the control branch. The disclosed method for controlling the safety-relevant process is characterized in that a decision-making module is provided in each microcontroller, in which the at least one sensor of the respective control branch is verified, wherein to perform the verification the data of the respective sensor are exchanged between the microcontrollers and compared with each other. In addition, in the respective microcontroller a model value is computed on the basis of the control commands that control the process, which value reflects the ideal behavior of the control branch. In the decision-making module, if a deviation is detected a majority decision is taken using the at least three equivalent information items, namely the two actual values that reflect the real behavior, and the model value. This has the effect that the control of the safety-relevant process by the microcontroller of the control branch, in which the sensor whose data differ from the data of the other sensor and the model value is localized, is disabled. The third entity is thus implemented by calculation of the model value and an additional sensor can be omitted.

Briefly summarized, it is mentioned that at least one disclosed embodiment consists in the fact that a new item of information for making the majority decision is generated based on the mechanical coupling of both control branches via a machine element. In one example the machine element is a rotor shaft of an electric motor.

Optionally, the respective decision-making module is installed on each microcontroller via software. No additional hardware expenditure is required, and the decision-making module can easily be adapted to the individual control process.

The disabling of the control of the safety-relevant process can be carried out by deactivation or partial deactivation of the control of the safety-relevant process by the microcontroller itself, in which the sensor in which the deviation was detected is localized. This is an alternative design that is simple to implement. In another disclosed embodiment, the configuration can also be such that the other microcontroller performs the deactivation.

The solution can be applied in control systems, in which rotor position sensors can be used to reproduce the control process. This is always the case when electric motors are controlled. The decision-making modules then verify the proper functioning of the rotor position sensors, which are exposed to particularly high loads.

To be able to compare the actual characteristic of the control branch, it is beneficial if a software module for calculating the actual characteristic is installed on each microcontroller, wherein the module is supplied at least with the data of the rotor position sensor for the respective control branch.

It is equally beneficial if a software module for calculating the ideal rotor characteristic is installed on at least one of the microcontrollers, wherein the module is supplied at least with the data from the control command(s) that were transmitted to the control unit for controlling the control process. The control commands can be considered to be a target specification and the ideal rotor behavior can be calculated from them.

To make the majority decision in the decision-making module, the data from the microcontroller-specific modules for calculating the actual rotor characteristic and for calculating the ideal rotor characteristic and at least from the module for calculating the actual rotor characteristic can be used by the at least one other microcontroller. This is easy to implement and satisfies the safety requirement that the operation of the rotor position sensors should be verified by a third entity.

The proposal can be used for the application case of the control of a steering process in a transportation vehicle. As long as the driver continues to specify the steering command, the steering commands are transmitted to the power steering control unit. In the field of autonomous driving, in the future the steering commands will be transmitted to the steering control unit from another computer without any action on the part of the driver. In steer-by-wire systems the driver still steers by him/herself, but the steering commands enter the power steering control unit via the communication bus, as is the case in autonomous driving.

In the steering system the control process comprises specific phases of a multi-phase electric motor for the steering process being activated by each of the at least two microcontrollers, to bring about a movement of the steering rack in accordance with the steering command. In an alternative design, specific phases of a multi-phase electric motor for the steering process are activated by each of the at least two microcontrollers, and the control of the steering process is then disabled by breaking the connection between the microcontroller, which the data of the rotor position sensor as being faulty, and the corresponding phases of the multi-phase electric motor. A phase separator can be used for this purpose. This has the benefit that a part of the power steering is maintained and the transportation vehicle can be operated with less steering comfort for a short time, at least until a safe state is reached, which may be a parking space or a repair workshop or the hard shoulder or by "snaking along" (to warn following traffic), with braking to a standstill on the current carriageway.

For a corresponding apparatus for controlling a safety-relevant process the corresponding measures are beneficial. The device is redundantly designed with at least two microcontrollers, and each of the at least two microcontrollers is designed for controlling the safety-relevant process. The apparatus has a communication bus, which is designed for exchanging data between the microcontrollers. Each microcontroller processes the data of at least one sensor in the respective control branch, which reflects the actual characteristic of the control branch. The disclosed apparatus is characterized in that each microcontroller has a decision-making module for verifying the at least one sensor of the respective control branch. To perform the verification, in the decision-making module the data of the respective sensor are compared with the data of the sensor in the second branch, which are exchanged between the microcontrollers for this purpose.

In addition, in the respective microcontroller a model value is computed on the basis of the control commands that control the process, which value reflects the ideal behavior of the control branch. In the decision-making module, if a deviation is detected a majority decision is taken using the at least three equivalent information items, namely the two actual values that reflect the actual behavior, and the model value. This has the effect that the control of the safety-relevant process by the microcontroller of the control branch, in which the sensor whose data differ from the data of the other sensor and the model value is localized, is disabled. The third entity is thus implemented by the software module for calculating the model value and an additional sensor can be omitted.

The solution can be used for control systems in which rotor position sensors are used to reproduce the control process. This is always the case when electric motors are controlled. The decision-making modules then verify the proper functioning of the rotor position sensors, which are exposed to particularly high loads.

In an alternative design at least two rotor position sensors are used, one for each control branch whose data are fed to the at least two microcontrollers.

So that the data can be compared with the model-based ideal rotor characteristic, it is beneficial if a software module is installed on each microcontroller for calculating the actual rotor characteristic, which processes at least the data of the rotor position sensor in the control branch.

It is also beneficial if a software module for calculating the ideal rotor characteristic based on a target specification is installed on at least one of the microcontrollers, which processes at least the data of the target specification.

The apparatus can be used for controlling a steering process in a transportation vehicle.

The disclosed embodiments can be used in all transportation vehicles with an automated driving function of level 3 or above (according to VDA).

The following description illustrates the principles of the disclosure. It goes without saying, therefore, that persons skilled in the art will be in a position to design different arrangements which, although not explicitly described here, nevertheless embody the principles of the disclosure and are also intended to fall within its scope of protection.

FIG. 1 shows the typical cockpit of a transportation vehicle 10. The transportation vehicle shown here is a passenger car. Any other type of transportation vehicle could also be considered as the transportation vehicle 10, however. Examples of other vehicles are: buses, commercial vehicles, in particular, lorries, agricultural machinery, construction vehicles, rail vehicles etc. The use of the disclosed embodiments would be generally possible in land-based transportation vehicles, rail vehicles, water-borne vehicles and aircraft.

The component essential in the transportation vehicle 10 is the steering system, of which the steering wheel 12 with parts of the steering column can be seen in the cockpit. In addition, in FIG. 1 a display unit of an infotainment system is highlighted with reference numerals. This involves a touch-sensitive screen 20, which is mounted in the central console.

The touch-sensitive screen 20 is used to operate functions of the transportation vehicle 10. For example, it could be used to control a radio, a navigation system, a playback of stored music tracks and/or an air-conditioning system, or other electronic devices or other convenience functions or applications of the transportation vehicle 10. Collectively, this is often referred to as an "infotainment system". An infotainment system in transportation vehicles, in particular, cars, designates the combination of a car radio, navigation system, speakerphone device, driver assistance systems and other functions in a central control unit. The term infotainment is a portmanteau word, composed of the words information and entertainment. The infotainment system is operated mainly using the touch-sensitive screen 20 ("touch screen"), wherein this screen 20 can be easily viewed and operated by a driver of the transportation vehicle 10, but also by a passenger of the transportation vehicle 10. Below the screen 20, mechanical controls such as buttons, rotary knobs or combinations thereof, such as rotary pressure knobs, can also be arranged in an input unit 50. Typically, operation of parts of the infotainment system is also possible from the steering wheel. To this end, the transportation vehicles are equipped with a so-called multi-function steering wheel control unit. This unit is not shown separately, but is considered to be part of the input unit 50.

Figure 2:
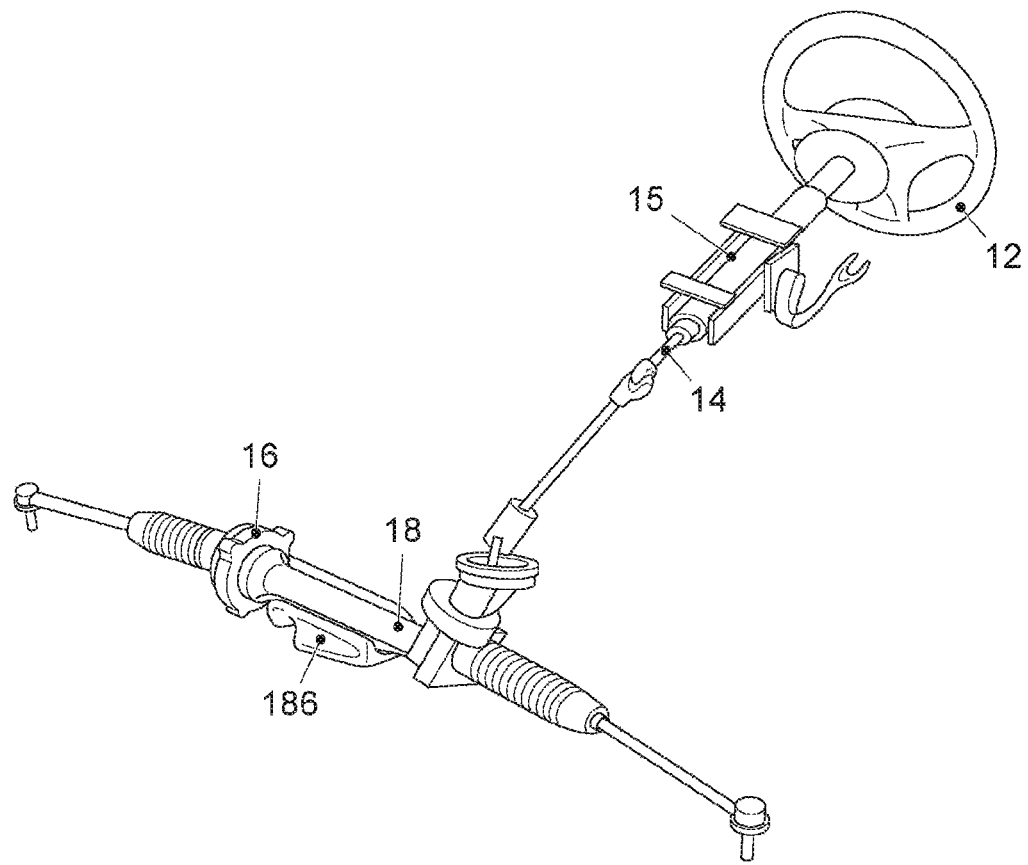
FIG. 2 shows an overall view of a typical steering system for a transportation vehicle.

Back to the steering system of the transportation vehicle 10. An overall view of the steering system is shown in FIG. 2. The main components are the steering wheel 12, the steering column 14, the torque sensor 15, the electric motor 16, the steering rack 18 and the power-assisted steering control unit 186.

Figure 3:
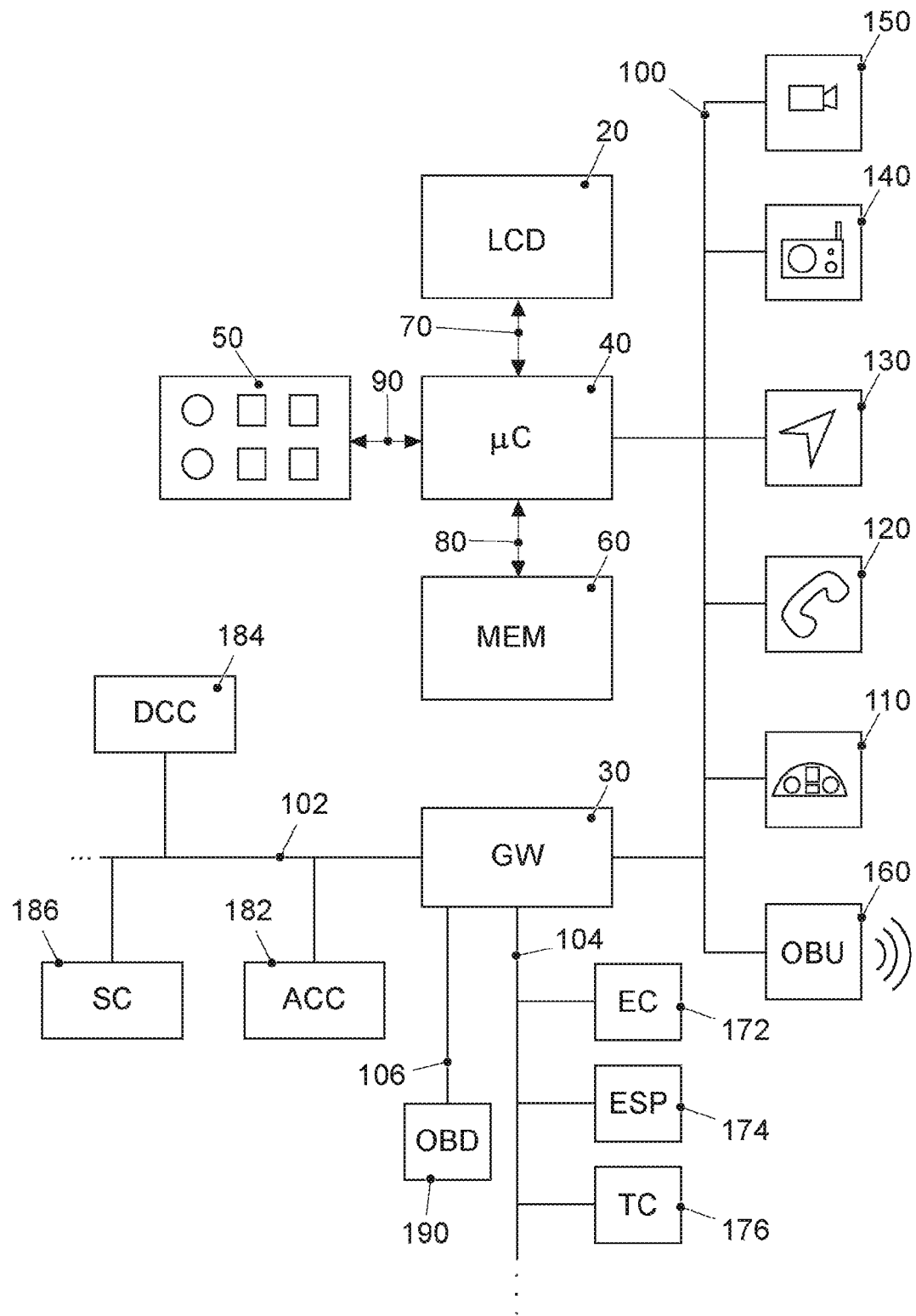
FIG. 3 shows a block wiring diagram of the vehicle electronics of the transportation vehicle.

FIG. 3 shows a schematic block wiring diagram of the transportation vehicle electronics 200 and some examples of sub-systems or applications of the infotainment system. Thus, the infotainment system comprises: the touch-sensitive display unit 20, a computation device 40, an input unit 50 and a memory 60. The display unit 20 comprises both a display area for displaying variable graphical information, and a control surface (touch-sensitive layer) positioned above the display area for entering commands by a user.

The display device 20 is connected to the processing device 40 via a data line 70. The data line can be designed according to the LVDS standard, corresponding to Low Voltage Differential Signaling. Via the data line 70 the display unit 20 receives control data for controlling the display area of the touch screen 20 from the processing device 40. Via the data line 70, control data from the input commands are also transmitted from the touch screen 20 to the processing device 40. The reference numeral 50 designates the input unit. Associated with this are the above-mentioned controls such as buttons, rotary knobs, slider controls or rotary pressure knobs, with which the operator can make entries via the menu navigation. The term 'entry' is generally understood to mean calling up a selected menu option, as well as changing a parameter, switching a function on and off etc.

The storage device 60 is connected to the processing device 40 via a data line 80. The memory 60 contains a stored catalog of icons and/or a symbol catalog with the icons and/or symbols for possible displays of additional information.

The other parts of the infotainment system, camera 150, radio 140, navigation device 130, telephone 120 and instrument cluster 110 are connected to the device for operating the infotainment system via the data bus 100. The high-speed property of the CAN-bus in accordance with ISO standard 11898-2 is a suitable choice for the data bus 100. Alternatively, the use of a bus system based on Ethernet technology, such as IEEE 802.03cg, is also possible. Bus systems in which the data transmission takes place via fiber-optic cables can also be used. Examples to be cited are the MOST bus (Media Oriented System Transport) or the D2B bus (Domestic Digital Bus). For wireless communication internally and externally, the transportation vehicle 10 is equipped with a communication module 160. This module is often referred to as an on-board unit. It can be designed for mobile radio communication, e.g., based on the LTE standard, corresponding to Long Term Evolution. It can also be designed for WLAN communication, in accordance with Wireless LAN, either for communication with devices belonging to the occupants of the transportation vehicle or for the vehicle-to-vehicle communication etc.

The communication bus 100 of the infotainment system is connected to a gateway 30. Also attached to this are the other parts of the vehicle electronics. One of these is the communication bus 104 of the drive train, which is typically implemented as the CAN bus. As examples, the control units of the drive train, engine control unit 172, ESP control unit 174 and transmission control unit 176 are shown. Also shown is the communication bus 102 for driver assistance systems, which can be implemented as the Flexray bus. Three driver assistance systems are shown: a driver assistance system 182 for automatic distance control ACC, corresponding to adaptive cruise control, a driver assistance system for adaptive suspension control 184 DCC, corresponding to Dynamic Chassis Control, and a power steering system 186. In addition, another communication bus 106 is connected to the gateway 30. This connects the gateway 30 to an on-board diagnostic interface 190. The function of the gateway 30 is to make the format conversions for the various communication systems 100, 102, 104, 106, so that data can be exchanged between them.

In the following the power steering control unit 186 is discussed in more detail.

Figure 4:
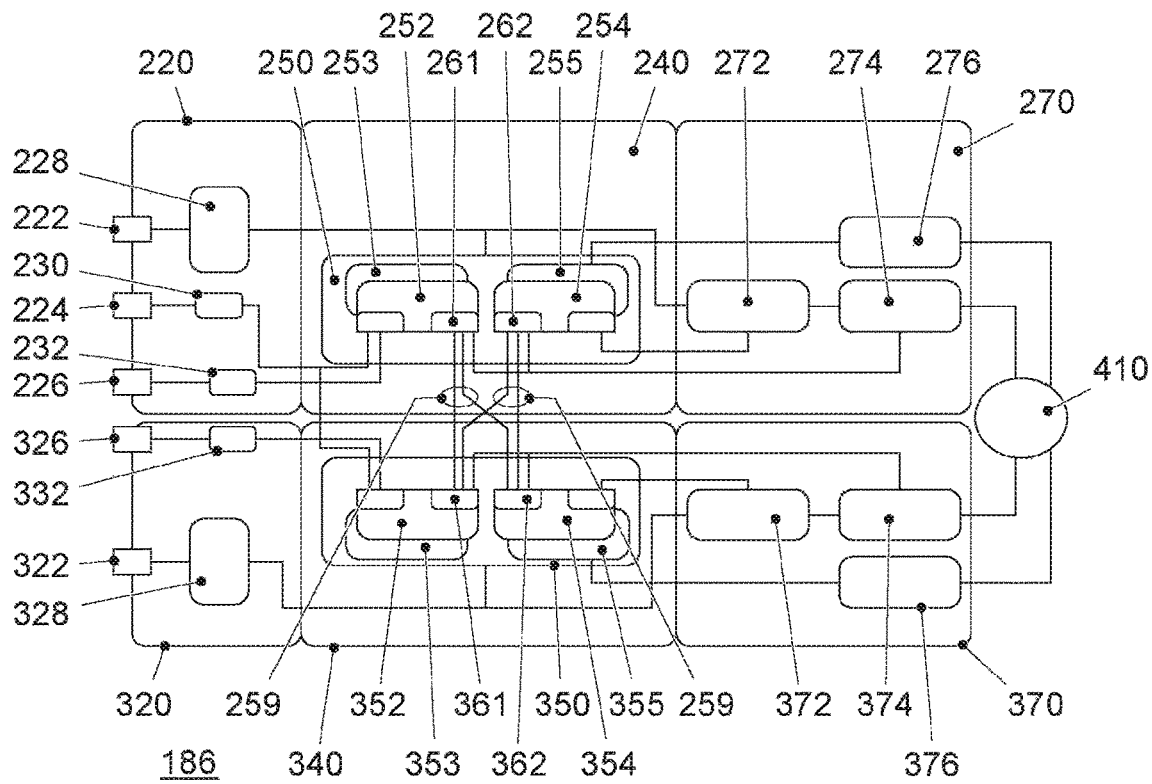
FIG. 4 shows a block wiring diagram of a redundantly designed power steering control unit using multi-core microcontrollers.

The hardware-based design is shown in FIG. 4. As already mentioned, for safety reasons it is redundantly designed. The steering process is controlled by two parallel branches, designated by channel 1 and channel 2. The parts of the input electrics 220, 320, logic section 240, 340, and power section 270, 370 are each present in duplicate. Also shown is the multi-phase electric motor 410, which is controlled by the power steering control unit 186. In this case, to provide full power steering assistance, the electric motor 410 is controlled by both branches. If a fault should occur in one of the two branches, then the control by this branch is disabled for safety reasons. As a result, the driver no longer receives full steering assistance, but the steering remains guaranteed by the control of the other branch until the transportation vehicle 10 can be steered safely onto the side of the road or into an emergency lay-by, or onto a parking lot. The system is designed in such a way that the driver does not need to intervene to do this. The steering system can still perform the steering process automatically. After this emergency stop, it is possible to continue driving with manual operation of the steering.

An implementation could also be designed such that both the control branches can deliver the full assistance individually. Thus, it may also be possible that after a fault has occurred in one branch the journey is completed automatically with the remaining functional branch until "ignition off". For safety however, switching on the automatic driving function again would then be blocked.

In each of the input electrical parts 220 and 320 there is a filter unit 228 and 328, in which, for example, the chokes and filters are arranged to compensate for fluctuations in the supply voltage. The supply voltage is applied to the power connector 222. The contact 224 is used for connecting to the torque sensor 15 of the steering system. In the future it may also be the case that both branches will have their own torque sensor. This is mounted on the steering column 14 and is read in directly. In the future, such a sensor might be omitted. Steering systems that can function without a mechanical steering column are already being developed under the steer-by-wire program. From the torque sensor 15 the information on which forces are acting on the steering then enters the power steering control unit 186. With the torque sensor 15 the necessary data on angle of rotation, direction of rotation and torque are typically captured electronically. This is important to be able to determine the force that the electric motor 410 must apply to be able to support the steering operation. This input signal from the torque sensor 15 is forwarded internally to both microcontrollers 250 and 350.

It should be borne in mind that the steering operation must be controlled very precisely. Other information, e.g., the speed of the transportation vehicle, plays an important role in this. Therefore each microcontroller 250, 350 is connected to the communication bus 102 separately. The power steering control unit 186 therefore has two bus connectors 226 and 326 for the transportation vehicle bus. Therefore, the steering function is ensured even if a defect is present in one of the bus connectors or supply cables. The logic sections 240 and 340 of the power steering control unit 186 essentially contain one of the two microcontrollers 250 and 350. The microcontroller 250 in the example shown contains the two computing cores 252 and 254. The microcontroller 350 contains the two computing cores 352 and 354. The computing cores of a microcontroller are connected to each other, so that they can exchange data, in particular, calculation results. A parallel bus is typically used accordingly for this purpose. Between all four computing cores 252, 254, 352, 354 of the microcontrollers 250, 350, data can also be exchanged among them. In at least one disclosed embodiment, the communication bus 259 between the two microcontrollers 250, 350 is implemented as an Ethernet bus. In another development, it can also be implemented as a FlexRay or CAN-FD communication bus. The data exchange facility is also necessary in the safety concept, according to which the microcontrollers mutually verify each other and can switch each other off when a fault is detected. The functionality of the mutual verification of the microcontrollers is the subject of another patent application, however, so that this function is not discussed in detail here.

FIG. 4 shows that each computing core has two communication ports, e.g., Ethernet ports, via which it is connected to the two computing cores of the other microcontroller. Another special feature is that the computing cores 252 and 352 are equipped with so-called lockstep computing cores 253 and 353. These correspond to parallel computers, which are executing exactly the same program. The parallel connection is not used to increase performance, but instead for monitoring purposes. A comparison of the results of the individual computing cores takes place, which is performed in individual, temporally short and non-interruptible operations. The redundancy thus achieved allows hardware-related failures in one of the computing cores to be detected and responded to, as is the case in a dual-core in lockstep operation.

The power section of the power steering control unit 186 also has a parallel structure. The control signal for controlling the electric motor 410 is output by the respective microcontroller 250, 350, such as PWM signals, corresponding to "pulse width modulation". These are implemented in the power section 270 and 370 in corresponding converter circuits 272, 274 and 372, 374. In FIG. 4 the electric motor is shown as a 6-phase motor. Depending on which phases are activated, more or less force will be transferred to the steering rack. When all phases are activated, the greatest force is applied. To be able to control this, one converter circuit 272 or 372 is provided per microcontroller 250, 350. These are all so-called Gate Drive Units GDU, which convert the PWM signal into corresponding signals for driving an amplifier (power MOSFET or IGBT module). Before the control signals to the electric motor 410, they pass through a phase separation circuit 274 and 374. Via the phase separator circuitry a deactivation of the control of the electric motor 410 can be performed in the corresponding path. According to the connections drawn between microcontrollers and phase separation circuits, a deactivation of each control can only be carried out by the microcontroller of the respective control branch. For each branch a further rotor position sensor 276, 376 is provided. This captures the movement of the rotor of the electric motor 410.

As mentioned above, the safety concept requires that the power steering control unit 186 has a redundant design. There are therefore two control branches, each of which is able to maintain the control function. The correct function of the two microcontrollers 250, 350 is verified by a logical decision-making module 261, 262, 361, 362, which is distributed over the various computing cores of the microcontrollers 250, 350. Furthermore, according to the safety concept the proper functioning of the rotor position sensors 276, 376 is also verified. How this is carried out in accordance with the new proposal is described in detail below.

Figure 5:
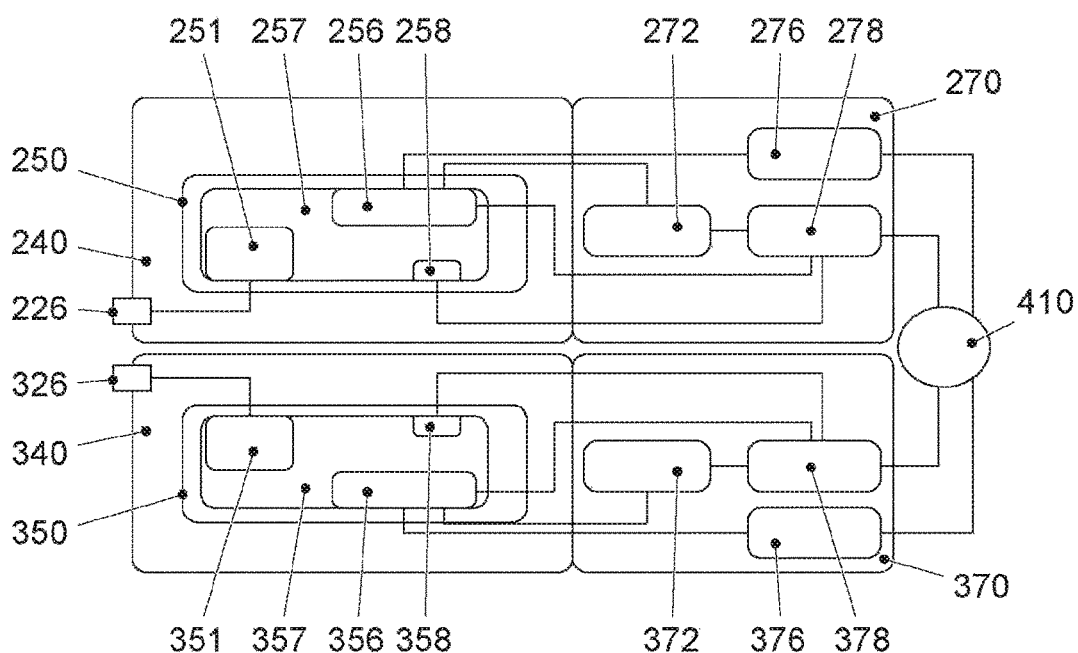
FIG. 5 shows a block wiring diagram of a redundantly designed power steering control unit with integrated state observer.

FIG. 5 shows the main components and modules that are used. The same reference numbers refer to the same components, as shown in FIG. 4. The logic sections 240, 340 and power sections 270, 370 of the two control branches of the power steering control unit 186 are shown. In the input electrical parts 220, 320 no modifications are required; therefore these parts are not shown in detail. In the logic sections 240, 340 the two microcontrollers 250 and 350 are shown. The microcontrollers 250 and 350 can be the same as those shown in FIG. 4. By contrast, in FIG. 5 one software module is shown for each of the microcontrollers 250, 350. These software modules are state observers 257, 357, which have the purpose of monitoring the proper functioning of the rotor position sensors 276, 376. This takes place as follows:

The state observers 257, 357 each contain a software module for determining the ideal rotor characteristic 251, 351. This module calculates the required movement of the rotor as a function of the input variables of the torque sensor 15 or additional information, such as the steering command that was calculated by a driver assistance system and transferred via the communication bus 102 to the power steering control unit 186, and the speed of the transportation vehicle, which was transferred from the instrument cluster 110 to the power steering control unit 186. From the target specification, such as the steering command, the ideal change of the rotor in the electric motor 410 is determined. The ideal change consists, e.g., of the rotor angle to be set and the rotor speed to be set or the rotor acceleration to be set. The exact type of calculation is not crucial to the further explanation of the proposal.

It is important, however, that the respective state observer contains a further software module 256, 356. This is used to determine the actual rotor characteristic. To this end these software modules evaluate the data of the respective rotor position sensor 276, 376 and a component for phase readback 278, 378. In this phase readback component the measurement data of phase current and phase voltage are captured. The use of this information makes the detection of the actual rotor movement more accurate. In principle, the actual rotor characteristic could also be determined without phase readback. The current rotor position, i.e., the current angle of the rotor in the built-in electric motor 410, is detected via the rotor position sensor 276, 376. Although the phase separator component is no longer shown separately in FIG. 5, it should be noted that this function is incorporated into the phase readback component 278, 378.

The proper functioning of the rotor position sensors 276, 376 is verified as follows. In each of the state observers 257 and 357 a decision-making module 258, 358 is provided. In these decision-making modules the ideal rotor characteristic determined by the other modules of the state observer and the actual rotor characteristic are compared with each other. To be able to make a reliable decision, the actual rotor characteristic which was detected by the respective other microcontroller is also compared. For this purpose, the data with the calculated rotor characteristics are exchanged between the microcontrollers 250, 350. Three decisions are therefore available, from which a majority decision can be made. Two independent actual values, and a model value. These three pieces of information then form the basis for a majority decision.

In the respective decision-making module 258, 358, a majority decision is made in each case with the data of the ideal rotor characteristic and the data of the two determined actual rotor characteristics. If it becomes apparent that a deviation is present in one of the actual rotor characteristics, then the corresponding branch, in which the rotor position sensor 276, 376 that is detected as faulty is located, is switched off. To this end a connection exists between the microcontrollers 250, 350 and the corresponding phase readback component 278, 378, which is also responsible for the phase separation.

All examples mentioned herein, as well as conditional formulations, are to be understood as being without limitation to such specifically mentioned examples. Thus, for example, it will be acknowledged by persons skilled in the art that the block diagram shown here represents a conceptual view of an exemplary circuit arrangement. In a similar way it should be recognized that any illustration of a flow chart, state transition diagram, pseudo-code and the like represents different options for the purpose of illustrating processes which are essentially stored in computer-readable media and can therefore be executed by a computer or processor.

It should be understood that the proposed method and the associated devices can be implemented in various forms of hardware, software, firmware, special processors or a combination of these. Special processors can comprise application specific integrated circuits (ASICs), Reduced Instruction Set Computers (RISC) and/or Field Programmable Gate Arrays (FPGAs). Optionally, the proposed method and the device are implemented as a combination of hardware and software. The software may be installed as an application program on a software storage device. Typically, this will be a machine based on a computer platform, which has hardware such as one or more central processing units (CPU), a random access memory (RAM) and one or more input/output (I/O) interface(s). In addition, an operating system is typically installed on the computer platform. The various processes and functions which have been described here can either be part of the application program, or executed as part of the operating system.

The disclosure is not limited to the exemplary embodiments described here. There is scope for various adaptations and modifications, which the person skilled in the art due to his expertise would also consider as belonging to the disclosure.

Another example to mention is the disclosed embodiment in which the control commands are not transmitted to the control unit from outside, but are generated in the control unit itself.

LIST OF REFERENCE NUMERALS

10 transportation vehicle
12 steering wheel
14 steering column
15 torque sensor
16 electric motor
18 steering rack
20 touch-sensitive display unit
30 gateway
40 computation unit
50 input unit
60 memory unit
70 data line to the display unit
80 data line to the memory unit
90 data line to the input unit
100 1st data bus
102 2nd data bus
104 3rd data bus
106 4th data bus
110 instrument cluster
120 telephone
130 navigation device
140 radio
150 camera
160 communication module
172 engine control unit
174 ESP control unit
176 transmission control unit
182 distance regulator control unit
184 suspension control unit
186 power steering control unit
190 on-board diagnosis connector
220 input electrics 1
222 power connector 1
224 DME 1
226 communication bus connector 1
228 filter stage 1
230 transmitting and receiving module
232 bus transceiver 1
240 logic section 1
250 microcontroller 1
251 model value calculation 1
252 computing core 1
253 lockstep unit 1
254 computing core 2
255 lockstep unit 2
256 actual value calculation
258 logical decision-making stage 1
259 communication bus
261 decision module 1
262 decision module 2
270 power section 1
272 GDU converter 1
274 phase separator 1
276 rotor position sensor 1
278 phase readback 1
320 input electrics 2
322 power connector 2
326 communication bus connector 2
328 filter stage 2
332 bus transceiver 2
340 logic section 2
350 microcontroller 2
351 model value calculation 2
352 computing core 3
353 lockstep unit 3
354 computing core 4
355 lockstep unit 4
356 actual value calculation 2
358 logical decision-making stage 2
361 decision module 3
362 decision module 4
370 power section 2
372 GDU converter 2
374 phase separator 2
376 rotor position sensor 2
378 phase readback 2
410 multiphase electric motor

The invention claimed is:

1. An apparatus for controlling a safety-relevant process in a steering system of an autonomous vehicle, the apparatus comprising:
  at least two microcontrollers that are each redundantly configured to independently control the safety-relevant process
  at least one sensor corresponding to each of the at least two microcontrollers, wherein each microcontroller of the at least two microcontrollers processes the data from the at least one corresponding sensor, and wherein the corresponding at least one sensor for each of the at least two microcontrollers captures a measured characteristic of a respective control branch that includes one of the at least two microcontrollers and the corresponding at least one sensor;
a communication bus for exchange of data between the at least two microcontrollers from their at least one corresponding sensors,
wherein a decision-making module is provided in each of the at least two microcontrollers,
wherein each decision-making module receives and analyzes both a first data set provided by the at least one sensor corresponding to the at least one microcontroller that includes the decision-making module and a second data set provided by the at least one sensor corresponding to the microcontroller not including the decision making module, wherein each decision-making module receives the second data set through the communication bus, wherein the analysis determines consistency between the first and second data sets,
wherein each decision-making module is configured to make a majority decision in response to a detected inconsistency among the first data set, the second data set, and a model value, whereby the at least one microcontroller corresponding to the data set found to be inconsistent with other data sets including the model value is disabled.

2. The apparatus of claim 1, wherein the at least one sensor comprises at least one rotor position sensor, wherein the at least one rotor position sensor detects an angle of a rotor within an electric motor.

3. The apparatus of claim 2, wherein the at least one rotor position sensor comprises two rotor position sensors, the two rotor position sensors detecting the angle of the same rotor, and each microcontroller further comprises a unique module for calculating a rotor position, wherein the module processes at least the data of the at least one rotor position sensor.

4. The apparatus of claim 2, further comprising a module installed on at least one of the at least two microcontrollers, wherein the module is configured to calculate a rotor characteristic based on a target specification.

5. A transportation vehicle comprising an apparatus for controlling a safety-relevant process, the apparatus comprising:
at least two microcontrollers that are each redundantly configured to independently control the safety-relevant process
at least one sensor corresponding to each of the at least two microcontrollers, wherein each microcontroller of the at least two microcontrollers processes the data from the at least one corresponding sensor, and wherein the corresponding at least one sensor for each of the at least two microcontrollers capture a measured characteristic of a respective control branch that includes one of the at least two microcontrollers and the corresponding at least one sensor;
a communication bus for exchange of data between the at least two microcontrollers from their at least one corresponding sensors,
wherein a decision-making module is provided in each of the at least two microcontrollers,
wherein each decision-making module receives and analyzes both a first data set provided by the at least one sensor corresponding to the at least one microcontroller that includes the decision-making module and a second data set provided by the at least one sensor corresponding to the microcontroller not including the decision making module, wherein each decision-making module receives the second data set through the communication bus, wherein the analysis determines consistency between the first and second data sets,
wherein each decision-making module is configured to make a majority decision in response to a detected inconsistency among the first data set, the second data set, and a model value, whereby the at least one microcontroller corresponding to the data set found to be inconsistent with other data sets including the model value is disabled.

6. The transportation vehicle of claim 5, wherein the at least one sensor further comprises at least one rotor position sensor, the data of which being supplied to the at least two microcontrollers, wherein the at least one rotor position sensor detects an actual characteristic of a rotor in an electric motor.

7. The transportation vehicle of claim 6, wherein a module is installed on each microcontroller of the at least two microcontrollers, wherein the module processes at least the data of the at least one rotor position sensor.

8. The transportation vehicle of claim 6, wherein a module is installed on at least one microcontroller for calculating the ideal rotor position based on a target specification.

9. The transportation vehicle of claim 5, wherein the safety-related process is a steering operation of a transportation vehicle and the apparatus is installed in a transportation vehicle.

10. A method for controlling a safety-relevant process in a steering system of an autonomous vehicle, wherein at least two microcontrollers corresponding to at least two control branches are used to control the safety-relevant process based on data generated by at least one sensor included in each of the at least two control branches, the method comprising:
capturing actual characteristics of the respective control branch using the at least one sensor for the control branch;
processing the data from the at least one sensor of the respective control branch using the microcontroller of the respective control branch;
exchanging data captured by the at least one sensor between the at least two microcontrollers via a communication bus;
detecting an inconsistency between the exchanged data using a decision-making module provided for each of the at least two microcontrollers; and
making a majority decision by the decision-making module in response to an inconsistency being detected,
wherein a model value used in forming the majority decision is calculated in the microcontroller including the decision-making module, wherein the model value is compared to the exchanged sensor data, and the majority decision deactivates a microcontroller of the at least two microcontrollers that has provided exchanged data that fails to match the model value and the exchanged data provided by the other microcontroller.

11. The method of claim 10, wherein each one of the at least two microcontrollers are supplied with the data of at least two rotor position sensors connected thereto, and the at least two rotor position sensors detect an actual characteristic of the same rotor.

12. The method of claim 11, wherein a module is installed on each microcontroller for calculating an angular rotor position, wherein the module is supplied with at least the data of a rotor position sensor assigned thereto.

13. The method of claim 12, wherein a module is installed on at least one microcontroller of the at least two microcontrollers, wherein the module is configured to calculate a rotor characteristic based on a target specification.

14. The method of claim 13, wherein for the majority decision in the decision-making module, the data from the angular rotor position and an ideal rotor position act as the sensor data and model value respectively.

15. The method of claim 12, wherein the safety-related process is a steering operation for a transportation vehicle and the model value is a deviation from a target specification corresponding to a steering command.

16. The method of claim 15, wherein specific phases of a multi-phase electric motor are activated for the steering operation of each of the at least two microcontrollers.

* * * * *